July 18, 1961  R. JURENZ  2,992,599
VIEWFINDER

Filed May 9, 1960  2 Sheets-Sheet 1

Inventor
ROLF JURENZ
By Orwin S. Thompson
Attorney

July 18, 1961 R. JURENZ 2,992,599
VIEWFINDER
Filed May 9, 1960 2 Sheets-Sheet 2

Inventor
ROLF JURENZ
By Irvin S. Thompson
Attorney

2,992,599
VIEWFINDER

Rolf Jurenz, Dresden, Germany, assignor to VEB Kamera- und Kinowerke Dresden, Dresden, Germany
Filed May 9, 1960, Ser. No. 27,839
Claims priority, application Germany June 11, 1959
10 Claims. (Cl. 95—10)

The invention relates to an eye-level viewfinder with real intermediate image plane and reflected exposure factor indicators such as diaphragm aperture setting, exposure time setting, exposure meter pointer, exposure meter follow-up pointer, and range-finders.

The known eye-level viewfinders with real intermediate image plane, especially with split field rangefinder, have the disadvantage of great structural length. Furthermore, a multiplicity of optical parts is needed, which render these arrangements expensive. A further disadvantage of the known arrangements of this nature exists in that the end of an exposure meter pointer, in its movement about the axis of the pointer, moves out of the range of focus of the viewfinder eyepiece. Light frames for one or more different focal lengths of the main objective lens cannot be presented to the eye in those embodiments of eye-level viewfinders with real intermediate image plane known hitherto.

The invention removes these disadvantages and achieves further advantages due to the fact that approximately perpendicular to the optical axis of the viewfinder there is arranged in the position corresponding to the real intermediate image produced by the viewfinder a concave mirror which, in combination with the viewfinder eyepiece, reproduces the entrance pupil of the viewfinder lens, in the vicinity of the eye, and in its further development by the fact that into the light ray path of the viewfinder there is placed a partially transparent reflecting layer, inclined by 45° in relation to the optical axis, through which the light ray beam from the viewfinder passes. The light ray beam from the viewfinder is then reflected by the concave mirror back to the partially transparent reflecting layer from whence it is reflected to the viewfinder eyepiece. The invention thus combines the advantages of the viewfinder construction with real intermediate image plane and of the Newton viewfinder.

Two possible forms of embodiment of the invention are to be explained hereinafter, from which there may be seen further features peculiar thereto. It will be noted that all details which are not directly connected with the invention have been omitted.

Figure 1:
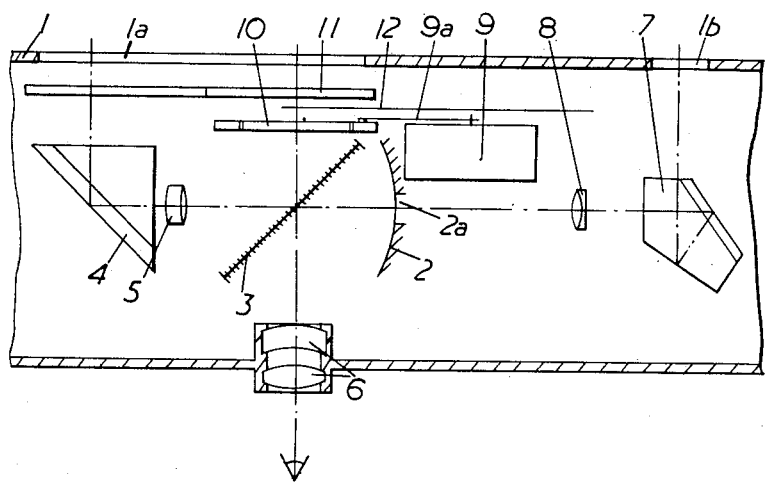
FIGURE 1 shows a viewfinder with rangefinder branch and the partially transparent reflecting layer.
Figure 2:
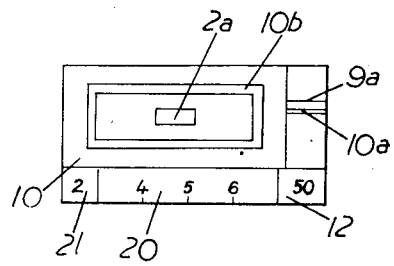
FIGURE 2 shows the viewfinder picture of FIGURE 1.

In the example of embodiment according to FIGURES 1 and 2, within a housing 1 there are a concave mirror 2, a partially transparent reflecting layer 3, an image-erecting prism 4, a viewfinder objective lens 5, a viewfinder eye-piece 6, a penta-hedral roof prism 7, a rangefinder objective lens 8, an exposure meter 9 with a pointer 9a, an exposure factor indicator 10, with a marking 10a and a picture frame 10b, a light diffusing plate 11 and an exposure time scale 12.

Through the viewfinder aperture 1a of the housing 1 light falls upon the image-erecting prism 4. This reflects it into the viewfinder objective lens 5, which projects a picture of the object upon the concave mirror 2, through the partially transparent reflecting layer 3. This real intermediate image is viewed at the viewfinder eyepiece 6 after reflection by the partially transparent reflecting layer 3.

The concave mirror 2, together with the viewfinder eyepiece 6, reproduce the entrance pupil of the viewfinder in the vicinity of the eye, in such way that the entire viewfinder picture appears illuminated brightly and evenly over its entire surface. At the same time the eye, with the aid of the viewfinder eyepiece 6, views through the partially transparent reflecting layer 3, the exposure factor indicator 10, the exposure time scale 12 and the exposure meter pointer 9a, and by means of the reflecting surface of the partially transparent reflecting layer 3, the rangefinder image projected in a light transmitting area 2a in the centre of the concave mirror 2, by the rangefinder objective lens 8.

This rangefinder image, like the viewfinder image, is sharply defined over its entire surface. Furthermore, the viewfinder image has marginal parts in which are shown images of parts of the exposure time scale 12, of a depth-of-focus scale 20 and of a diaphragm aperture scale 21. A special advantage of the arrangement is that a substantially greater magnification is achieved than is possible with a corresponding Newtonian viewfinder. Nevertheless, the required structural height is less than that required for a Newtonian viewfinder.

Figure 3:
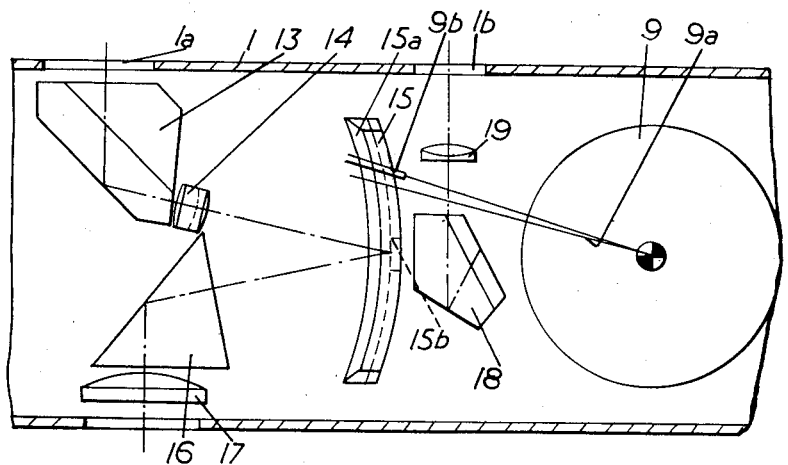
FIGURE 3 shows a viewfinder with rangefinder branch, without the partially transparent reflecting layer.
Figure 4:
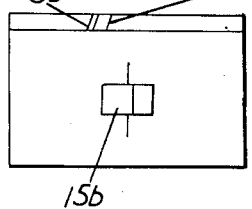
FIGURE 4 shows the viewfinder picture of FIGURE 3.

The example of embodiment according to FIGURES 3 and 4 has within the housing 1 an image-erecting prism 13, a viewfinder objective lens 14, a concave mirror 15 with a bevel-edge 15a and a light transmitting area 15b for the rangefinder image, a reflecting prism 16, a viewfinder eyepiece 17, a prism 18, a rangefinder objective lens 19, an exposure meter 9 with a pointer 9a and a follow-up pointer 9b. The light entering through the viewfinder window 1a is conducted as in the first example of embodiment and the viewfinder objective lens 14 projects an image of the object of which a picture is to be taken upon the concave mirror 15. A light ray is projected only approximately perpendicular to the concave mirror 15. Again the concave mirror 15 together with the viewfinder eyepiece 17 reproduce the entrance pupil of the viewfinder 14 in the vicinity of the eye, and ensure a viewfinder image which is illuminated evenly over the entire surface.

Simultaneously with the viewfinder image, the eye views through the viewfinder eyepiece 17 the rangefinder image passing through the light transmitting area 15b in the concave mirror 15 and, through the bevel-edge 15a of the concave mirror 15, the exposure meter pointer 9a and the follow-up pointer 9b or a scale arranged on the bevel-edge 15a. Obviously in both examples of embodiment all the known principles for reading off or setting of the exposure meter pointer or follow-up pointer or any other exposure factor indicator are applicable.

I claim:

1. A photographic camera, comprising a viewfinder eyepiece, rangefinder means for producing an image of an object to be photographed at said eyepiece, viewfinder means for producing another image of the object to be photographed at the eyepiece, and a concave mirror located in a plane approximately perpendicular to the optical axis of the viewfinder means in the position corresponding to the real intermediate image produced by said viewfinder means whereby said concave mirror and eyepiece together reproduced the entrance pupil of the viewfinder in the vicinity of the eye.

2. A photographic camera, comprising a viewfinder eyepiece, rangefinder means for producing an image of an object to be photographed at said eyepiece, viewfinder means for producing another image of the object to be photographed at the eyepiece, and a concave mirror located in a plane approximately perpendicular to the optical axis of the viewfinder means in the position corresponding to the real intermediate image produced by said viewfinder means whereby said concave mirror and eyepiece together reproduce the entrance pupil of the viewfinder in the vicinity of the eye, said concave mirror and eyepiece together reproduce the entrance pupil of the viewfinder in the vicinity of the eye, said concave mirror having a light transmitting area which allows the passage of a light ray beam to pass from the rangefinder means to the viewfinder eyepiece.

3. A photographic camera, comprising a viewfinder eyepiece, rangefinder means for producing an image of an object to be photographed at said eyepiece, view-finder means for producing another image of the object to be photographed at the eyepiece, and a concave mirror provided with a reflecting coating and located in a plane approximately perpendicular to the optical axis of the viewfinder means in the position corresponding to the real intermediate image produced by said viewfinder means whereby said concave mirror and eyepiece together reproduce the entrance pupil of the viewfinder in the vicinity of the eye, said mirror having a light transmitting area constituted by a surface portion of said concave mirror not provided with said reflective coating.

4. A photographic camera comprising a viewfinder eyepiece, rangefinder means for producing an image of an object to be photographed at said eyepiece, viewfinder means for producing another image of the object to be photographed at the eyepiece, and a concave mirror located in a plane approximately perpendicular to the optical axis of the viewfinder means in the position corresponding to the real intermediate image produced by said viewfinder means, said concave mirror possessing at least one reflective bevel edge.

5. A photographic camera comprising a viewfinder eyepiece, rangefinder means for producing an image of an object to be photographed at said eyepiece, viewfinder means for producing another image of the object to be photographed at the eyepiece, and a concave mirror located in a plane approximately perpendicular to the optical axis of the viewfinder means in the position corresponding to the real intermediate image produced by said viewfinder means, and markings on said concave mirror.

6. A photographic camera comprising a viewfinder eyepiece, rangefinder means for producing an image of an object to be photographed at said eyepiece, viewfinder means for producing another image of the object to be photographed at the eyepiece, a concave mirror located in a plane approximately perpendicular to the optical axis of the viewfinder means in the position corresponding to the real intermediate image produced by said viewfinder means, said concave mirror having a bevelled edge, and an exposure meter device having pointers, whereby said exposure meter device pointers move along the bevelled edge of said concave mirror, and are reflected by said bevelled edge, said concave mirror and eyepiece together reproducing the entrance pupil of the viewfinder and an image of the pointers in the vicinity of the eye.

7. A photographic camera comprising a viewfinder eyepiece, rangefinder means for producing an image of an object to be photographed at said eyepiece, viewfinder means for producing another image of the object to be photographed at the eyepiece, a concave mirror located in a plane approximately perpendicular to the optical axis of the viewfinder means in the position corresponding to the real intermediate image produced by said viewfinder means, and a partially transparent reflecting layer located on the optical axis of the viewfinder means inclined by 45° in relation to said optical axis of the viewfinder means, whereby the viewfinder light ray beam passes through said partially transparent reflecting layer and is then reflected by said partially transparent reflecting layer.

8. A photographic camera comprising a viewfinder eyepiece, rangefinder means for producing an image of an object to be photographed at said eyepiece, viewfinder means for producing another image of the object to be photographed at the eyepiece, a concave mirror located in a plane approximately perpendicular to the optical axis of the viewfinder means in the position corresponding to the real intermediate image produced by said viewfinder means, and a partially transparent reflecting layer located on the optical axis of the viewfinder means inclined by 45° in relation to said optical axis of the viewfinder means, whereby said partially transparent reflecting layer merely reflects the rangefinder light ray beam.

9. A photographic camera comprising a viewfinder eyepiece having main and marginal portions, rangefinder means for producing an image of an object to be photographed at said main portions of the viewfinder eyepiece, viewfinder means for producing another image of the object to be photographed at said main portions of the viewfinder eyepiece, a concave mirror located in a plane approximately perpendicular to the optical axis of the viewfinder means in the position corresponding to the real intermediate image produced by said viewfinder means, and exposure factor indicators arranged in relation to said mirror such that images of said exposure factor indicators appear in the marginal portions of the viewfinder eyepiece.

10. A photographic camera comprising a viewfinder eyepiece, rangefinder means for producing an image of an object to be photographed at said eyepiece, a first image erecting device located in the rangefinder means, viewfinder means for producing another image of the object to be photographed at the eyepiece, a second image-erecting device located in the viewfinder means, and a concave mirror located in a plane approximately perpendicular to the optical axis of the viewfinder means in the position corresponding to the real intermediate image produced by said viewfinder means.

References Cited in the file of this patent

UNITED STATES PATENTS

| | | |
|---|---|---|
| 2,127,925 | Leitz | Aug. 23, 1938 |
| 2,151,124 | Leitz | Mar. 21, 1939 |
| 2,157,548 | Leitz | May 9, 1939 |
| 2,346,076 | Mihalyi | Apr. 4, 1944 |
| 2,464,166 | Wood | Mar. 8, 1949 |

FOREIGN PATENTS

| | | |
|---|---|---|
| 466,923 | Great Britain | June 8, 1937 |